US009170762B2

(12) United States Patent
Okamura

(10) Patent No.: US 9,170,762 B2
(45) Date of Patent: *Oct. 27, 2015

(54) MULTIFUNCTION PERIPHERAL AND STORAGE MEDIUM

(71) Applicant: Sharp Kabushiki Kaisha, Osaka (JP)

(72) Inventor: Akihiro Okamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,028

(22) Filed: Apr. 28, 2014

(65) Prior Publication Data

US 2014/0233054 A1    Aug. 21, 2014

Related U.S. Application Data

(63) Continuation of application No. 13/273,574, filed on Oct. 14, 2011, now Pat. No. 8,751,764.

(30) Foreign Application Priority Data

Oct. 22, 2010   (JP) .................................. 2010-237453

(51) Int. Cl.
*G06F 7/04* (2006.01)
*G06F 15/16* (2006.01)
(Continued)

(52) U.S. Cl.
CPC ............ *G06F 3/1225* (2013.01); *G06F 3/1222* (2013.01); *G06F 3/1285* (2013.01); *H04N 1/4433* (2013.01); *H04N 2201/0094* (2013.01)

(58) Field of Classification Search
CPC ......... H04L 63/08; H04L 63/10; H04L 63/20; G06F 21/31; H04W 12/06

USPC ............................................................ 726/4
See application file for complete search history.

(56) References Cited

U.S. PATENT DOCUMENTS

2004/0168047 A1    8/2004 Fukai et al.
2004/0260821 A1   12/2004 Yamamoto et al.
(Continued)

FOREIGN PATENT DOCUMENTS

CN           1512707          7/2004
JP        2002-259339 A       9/2002
(Continued)

OTHER PUBLICATIONS

Co-pending U.S. Appl. No. 13/273,574, filed Oct. 14, 2011.
(Continued)

*Primary Examiner* — Kambiz Zand
*Assistant Examiner* — Stephen Sanders
(74) *Attorney, Agent, or Firm* — Renner, Otto, Boisselle & Sklar, LLP

(57) ABSTRACT

The storage section of the multifunction peripheral stores location information containing a storage location of software which transmits a control command whose execution is permissible. The execution permission judging section of the multifunction peripheral includes (I) a storage location detecting section which detects a storage location of software which has participated in a transmission of a received control command and (II) a command permitting/prohibiting section which (i) prohibits execution of the received control command when a storage location indicated by the location information is not detected by the storage location detecting section but (ii) permits execution of the received control command when the storage location is detected by the storage location detecting section.

12 Claims, 6 Drawing Sheets

(51) Int. Cl.
*G06F 17/30* (2006.01)
*H04L 29/06* (2006.01)
*G06F 3/12* (2006.01)
*H04N 1/44* (2006.01)

(56) References Cited

U.S. PATENT DOCUMENTS

2007/0113079 A1 5/2007 Ito et al.
2007/0255428 A1 11/2007 Nagata
2009/0138963 A1 5/2009 Sato et al.
2010/0268770 A1 10/2010 Kanasaki
2010/0269063 A1 10/2010 Takazawa

FOREIGN PATENT DOCUMENTS

JP 2007-299282 A 11/2007
JP 2008-186160 A 8/2008

OTHER PUBLICATIONS

Office Action for co-pending U.S. Appl. No. 13/273,574 dated Oct. 31, 2013.
Notice of Allowance for co-pending U.S. Appl. No. 13/273,574 dated Feb. 11, 2014.

FIG. 2

| ID | SUB-ID | ITEM TYPE | ITEM NAME | LOCATION INFORMATION (ITEM VALUE) |
|---|---|---|---|---|
| 1 | 1 | SERVER VARIABLE | REMOTE_ADDR | http://example.com/app1/ |
| 2 | 1 | SERVER VARIABLE | REMOTE_ADDR | http://localhost/ |
|  | 2 | HTTP HEADER | REFERER | http://example.com/app2/ |
| ⋮ | ⋮ | ⋮ | ⋮ | ⋮ |

FIG. 4 (a)

| APPLICATION NUMBER | APPLICATION NAME | URL |
|---|---|---|
| 1 | APPLICATION A | http://example.com/app2/ |
| 2 | APPLICATION B | http://example.com/app1/ |
| ⋮ | ⋮ | ⋮ |

FIG. 4 (b)

| ID | SUB-ID | APPLICATION NUMBER | ITEM TYPE | ITEM NAME | LOCATION INFORMATION (ITEM VALUE) |
|---|---|---|---|---|---|
| 1 | 1 | 2 | SERVER VARIABLE | REMOTE_ADDR | http://example.com/app1/ |
| 2 | 1 | - | SERVER VARIABLE | REMOTE_ADDR | http://localhost/ |
|  | 2 | 1 | HTTP HEADER | REFERER | http://example.com/app2/ |
| ⋮ | ⋮ | ⋮ | ⋮ | ⋮ | ⋮ |

FIG. 5 (a)

| APPLICATION NAME | URL |
|---|---|
| APPLICATION C | http://example.com/app3/ |

FIG. 5 (b)

| ID | ITEM TYPE | ITEM NAME | LOCATION INFORMATION (ITEM VALUE) |
|---|---|---|---|
| 1 | SERVER VARIABLE | REMOTE_ADDR | http://localhost/ |
| 2 | HTTP HEADER | REFERER | http://example.com/app3/ |

MULTIFUNCTION PERIPHERAL AND STORAGE MEDIUM

This Nonprovisional application Claims priority under 35 U.S.C. §119(a) on Patent Application No. 2010-237453 filed in Japan on Oct. 22, 2010, the entire contents of which are hereby incorporated by reference.

TECHNICAL FIELD

The present invention relates to a multifunction peripheral which is connected with a control server and executes a control command generated by application software stored in the control server.

BACKGROUND ART

A multifunction peripheral, which has a plurality of functions such as a copying function, a scanning function, a printing function, and a fax sending/receiving function, has conventionally been known. In recent years, such a multifunction peripheral is connected with a control server (application server), or the like via a communication network so as to carry out various kinds of processes. Specifically, the multifunction peripheral serves as a part of a total application system in which the multifunction peripheral functions in cooperation with application software (hereinafter, simply referred to as "application") which is operated on the control server. This makes it possible to easily establish a flexible system in which the functions of the multifunction peripheral and the functions of the control server appropriately cooperate with each other.

In such a system, the application in the control server transmits a control command to the multifunction peripheral so that a web server of the multifunction peripheral carries out a process corresponding to the control command. In other words, the functions of the multifunction peripheral are controlled by the application in the control server.

Moreover, in view of security maintenance, the multifunction peripheral as described above is sometimes set to execute a control command supplied from a highly reliable application (i.e., an application developed by a highly reliable vendor) but to prohibit execution of a control command received from a hardly-reliable application. For example, there is a method in which a control command, which contains a security identifier (e.g., a vendor key) indicative of a validity of the control command, is transmitted from an application to a multifunction peripheral, and then, on the multifunction peripheral side, whether or not to execute the control command is judged by checking the validity of the security identifier contained in the received control command.

In the method, however, the security identifier is transmitted via a communication path. In view of this, in a case where communication data can be intercepted in the employed communication path, it is necessary to encrypt the communication data (e.g., a control command) by using an encryption protocol such as an SSL (Secure Socket Layer). This causes a problem that the method cannot be applied to an application which cannot carry out a process using the encryption protocol.

CITATION LIST

Patent Literature

Patent Literature 1
Japanese Patent Application Publication, Tokukai, No. 2002-259339 (Publication Date: Sep. 13, 2002)

SUMMARY OF INVENTION

Technical Problem

Patent Literature 1 discloses an access-restriction program which permits an access to/from only a URL (Uniform Resource Locator) which has been authorized in advance. However, the access-restriction program has a problem that information other than the control command is also to be blocked in a communication with an access-restricted URL. In a case where, for example, the access-restriction program is applied to the above-described multifunction peripheral, there is a problem that a user cannot browse a site via the multifunction peripheral, and status information (indicative of a status of the multifunction peripheral), which is transmitted from the multifunction peripheral to the control server, is to be blocked.

The present invention is accomplished in view of the problems, and its object is to provide a multifunction peripheral which does not prohibit execution of a control command transmitted by highly-reliable software but prohibits execution of a control command transmitted by hardly-reliable software, while communication of information other than the control command is not blocked.

Solution to Problem

In order to attain the object, a multifunction peripheral of the present invention includes: an execution permission judging section which judges whether or not to permit execution of a control command received from software; and a storage section which stores at least one piece of location information each indicative of a storage location of software which transmits a control command whose execution is permissible, the execution permission judging section including: a storage location detecting section which detects a storage location of the software which has participated in the transmission of the control command received, a judgment section which judges whether or not the storage location indicated by the location information is detected by the storage location detecting section, and a command permitting/prohibiting section, in a case where the judgment section determines that the storage location indicated by the location information is not detected by the storage location detecting section, the command permitting/prohibiting section prohibiting execution of the control command received, or in a case where the judgment section determines that the storage location indicated by the location information is detected by the storage location detecting section, the command permitting/prohibiting section permitting execution of the control command received.

Advantageous Effects of Invention

According to the configuration of the present invention, it is possible to prohibit, without prohibiting execution of a control command transmitted from highly-reliable software, execution of a control command transmitted from hardly-reliable software, provided that the storage section stores location information indicative of a storage location of the highly-reliable software but does not store location information indicative of a storage location of the hardly-reliable software. Moreover, in the present invention, only execution of a control command is prohibited in a case where the judgment section determines that the storage location indicated by the location information stored in the storage section is not detected by the storage location detecting section. In other words, it is not prohibited to carry out information communication with software which has participated in the transmission of the control command whose execution is prohibited. The multifunction peripheral of the present invention therefore makes it possible to prohibit execution of a control command transmitted from hardly-reliable software but not to prohibit execution of a control command transmitted from highly-reliable software, while communication of information other than the control command is not blocked.

BRIEF DESCRIPTION OF DRAWINGS

FIG. 2 illustrates an example of a judgment table stored in a storage section included in a multifunction peripheral of the embodiment of the present invention.

FIG. 4(a) illustrates an application registration table used in a modification example, and FIG. 4(b) illustrates a judgment table used in the modification example.

FIG. 5(a) illustrates a table indicating an application name and a URL contained in an application package, and FIG. 5(b) illustrates a table indicating an item type, an item name, and location information contained in an application package.

DESCRIPTION OF EMBODIMENTS

The following describes an embodiment of the present invention, with reference to FIGS. 1 through 6. In the following description, an embodiment of a multifunction peripheral control system of the present invention is discussed.

<Configuration of Multifunction Peripheral Control System 100>

Figure 1:
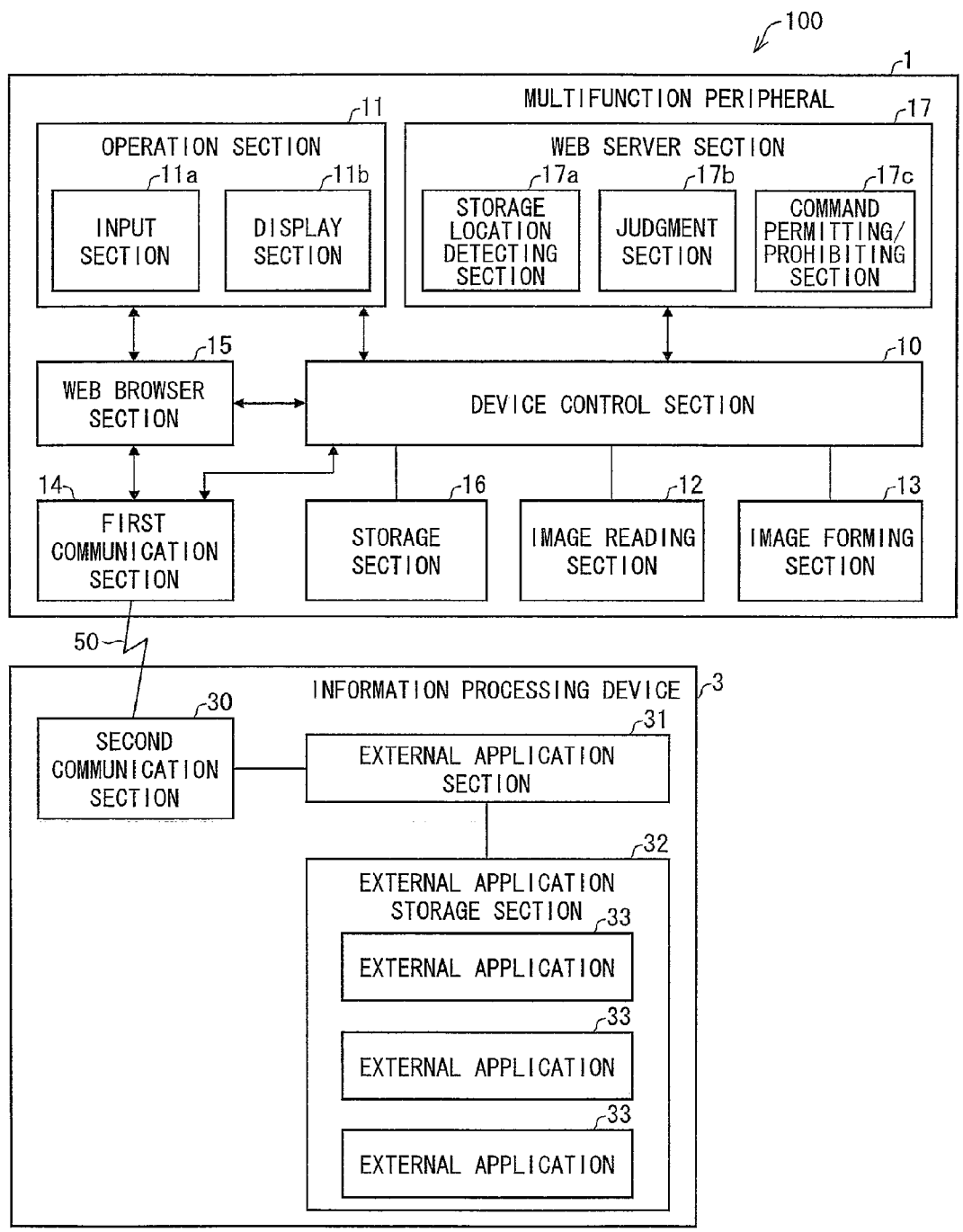
FIG. 1 is a block diagram illustrating a configuration of a multifunction peripheral control system of an embodiment of the present invention.

FIG. 1 illustrates a configuration of a multifunction peripheral control system of the present embodiment. A multifunction peripheral control system 100 of the present embodiment includes a multifunction peripheral 1 and an information processing device 3 which are connected with each other via a communication network 50 (see FIG. 1). The multifunction peripheral control system 100 may include, of course, a number of multifunction peripherals 1 and also a number of information processing devices 3.

Note that the communication network 50 can be a LAN (Local Area Network), a serial cable, the Internet, or other wired or wireless communication line. The multifunction peripheral 1 and the information processing device 3 communicate with each other by the use of an HTTP (Hypertext Transfer Protocol).

The multifunction peripheral 1 of the present embodiment carries out various functions thereof in cooperation with applications provided in the information processing device 3.

When, for example, a user inputs an activation request for a desired application into the multifunction peripheral 1, the activation request is sent from the multifunction peripheral 1 to the information processing device 3, and then the information processing device 3 activates an application for which the activation request has been issued. Subsequently, when the application being activated in the information processing device 3 transmits, based on the HTTP, a control command (e.g., for scanning job, printing job) in an HTML (Hypertext Markup Language) format to the multifunction peripheral 1, a web server section (execution permission judging section) 17 of the multifunction peripheral 1 receives the control command, and then judges whether or not to execute the control command. In a case where the web server section 17 permits the execution of the control command, a corresponding section(s) of the multifunction peripheral 1 is(are) operated based on the control command.

In a case where, for example, an application in the information processing device 3 is activated in response to an activation request supplied from the multifunction peripheral 1, the application transmits HTML data indicative of an operation screen of the application to the multifunction peripheral 1. A web browser section 15 of the multifunction peripheral 1 receives the HTML data from the information processing device 3, and then causes a display section 11b to display the operation screen indicated by the HTML data so that a control command, which corresponds to an instruction entered via the operation screen, is transmitted to the web server section 17 (i.e., the control command is transmitted from the web browser section 15 to the web server section 17 by cooperation between the web browser section 15 and the application in the information processing device 3). Then, the web server section 17 receives the control command and judges whether or not to execute the control command. In a case where the web server section 17 permits the execution of the control command, a corresponding section(s) of the multifunction peripheral 1 is(are) operated based on the control command.

The following describes details of the multifunction peripheral 1 and the information processing device 3.

<Configuration of Multifunction Peripheral 1>

The multifunction peripheral 1 is a multifunctional apparatus which integrally includes units such as a scanner, a printer, and a facsimile machine and executes a number of functions (e.g., scanning function, printing function, and communication function). The multifunction peripheral 1 includes a device control section 10, an operation section 11, an image reading section 12, an image forming section 13, a first communication section 14, a web browser section 15, a storage section 16, and a web server section 17.

The operation section 11 is a user interface which notifies a user of various kinds of information (by displaying such information) and accepts an input made by the user. The operation section 11 includes (i) an input section 11a having various kinds of input keys and (ii) a display section 11b such as an LCD (Liquid Crystal Display). Note that the operation section 11 can be a touch panel configured by integrating the input section 11a and the display section 11b.

The image reading section 12 includes a scanner and a document carrying section which carries a document to the scanner. The image reading section 12 reads, as image data, objects (such as characters and images) which are indicated on a document. The image forming section 13 is an electrophotographic printer which prints an image corresponding to image data supplied from an external device or the image reading section 12.

The first communication section 14 is an interface which communicates with an external device such as the information processing device 3 via the communication network 50. In the present embodiment, the first communication section 14 communicates with the information processing device 3 with the use of the HTTP. When the first communication section 14 receives a control command (i.e., HTTP request) from the information processing device 3, the first communication section 14 transmits the control command to the web server section 17 via the device control section 10. Moreover, when the first communication section 14 receives HTML data indicative of an operation screen from the information processing device 3, the first communication section 14 transmits the HTML data to the web browser section 15 via the device control section 10.

The web browser section 15 is operated in accordance with software of a web browser. The web browser section of the present embodiment, in particular, receives HTML data indicative of an operation screen from an external application section 31 included in the information processing device 3, and then causes the display section 11b to display the operation screen indicated by the HTML data. The web browser section 15 transmits a control command, which corresponds to an instruction entered via the operation screen displayed on the display section 11b, to the web server section 17 via the device control section 10.

The storage section 16 is a storage device which stores information such as (i) various kinds of information necessary to control the multifunction peripheral 1 and (ii) image data handled by the multifunction peripheral 1. In the present embodiment, a judgment table shown in FIG. 2 is stored in the storage section 16. Details of the judgment table will be described later.

The device control section 10 controls the sections included in the multifunction peripheral 1. Specifically, the device control section 10 controls an operation of each of the sections such as the operation section 11, the image reading section 12, the image forming section 13, the first communication section 14, the web browser section 15, and the web server section 17. The device control section 10 controls, for example, the image reading section 12 to carry out a scanning process for obtaining image data. Moreover, the device control section 10 controls the image forming section 13 to carry out a printing process for forming an image, which is indicated by inputted image data, on a sheet as an output.

The web server section 17 is operated in accordance with software of a web server. Here, the web server is software which provides a function of a server device constituting the WWW (World Wide Web), which is an information system on the Internet.

The web server section 17 of the present embodiment judges whether or not to permit execution of a control command which can be (i) a control command (i.e., HTTP request) received from the information processing device 3 via the first communication section 14 and the device control section 10 or (ii) a control command received from the web browser section 15 via the device control section 10. Note that details of the judgment process carried out by the web server section 17 will be described later.

In a case where the web server section 17 determines to permit the execution of the control command, the web server section 17 sends, to the device control section 10, an instruction on executing a process corresponding to the control command. The device control section 10 which has received the execution instruction causes a corresponding one(s) of the sections of the multifunction peripheral 1 to carry out the process corresponding to the control command. In a case where, for example, a received control command is directed to a scanning job, the device control section 10 causes the image reading section 12 to carry out the scanning process. Alternatively, in a case where a received control command is directed to a printing job, the device control section 10 causes the image forming section 13 to carry out a printing process.

On the other hand, in a case where the web server section 17 determines not to permit the execution of the control command, the web server section 17 issues an error notification indicating that the execution of the control command has not been permitted. In a case where an error notification is issued for a control command transmitted from an application in the information processing device 3, the error notification is sent from the web server section 17 to the device control section 10 and is then sent from the device control section 10 to the application. On the other hand, in a case where an error notification is issued for a control command which has been transmitted from the web browser section 15 in cooperation with an application in the information processing device 3, the error notification is sent from the web server section 17 to the device control section 10 and is then sent from the device control section 10 to the web browser section 15.

The device control section 10 which has received the error notification causes the multifunction peripheral 1 not to carry out a process corresponding to the control command. The application in the information processing device 3 or the web browser section 15 which has received the error notification recognizes that the execution of the control command has not been permitted.

Note that, in a case where the web browser section 15 receives the error notification, the web browser section 15 may notify a user of the error via the display section 11b.

For example, it is possible that the web browser section 15 which has received an error notification transfers the error notification to an application in the information processing device 3 which had transmitted a control command in cooperation with the web browser section 15. Then, the application which has received the error notification sends, to the web browser section 15, an instruction on displaying an error screen, and the web browser section 15 then causes, based on the instruction, the display section 11b to display the error screen.

Alternatively, it is possible that the web browser section 15 which has received an error notification sends a request for an error screen to a cooperated application in the information processing device 3. Then, the cooperated application which has received the request sends HTML data indicative of the error screen to the web browser section 15 so that the web browser section 15 causes the display section 11b to display the error screen.

Alternatively, it is possible that the web browser section 15 which has received an error notification causes the display section 11b to display an error screen based on HTML data which had already been received from a cooperated application in the information processing device 3.

As described above, the multifunction peripheral 1 of the present embodiment (a) carries out a process based on a control command received from the information processing device 3 or (b) (i) displays an operation screen indicated by HTML data which has been supplied from the information processing device 3 and then (ii) carries out a process based on a control command which has been generated in the multifunction peripheral 1 when an instruction is entered via the operation screen. In other words, the multifunction peripheral 1 carries out various kinds of processes in cooperation with the information processing device 3.

<Configuration of Information Processing Device 3>

The following describes the information processing device 3. The information processing device 3 is a computer configured by (i) an arithmetic processing section(s) such as a CPU (Central Processing Unit) and/or a dedicated processor and (ii) a storage device(s) such as a RAM (Random Access Memory), a ROM (Read Only Memory), and/or a hard disk. The information processing device 3 serves as a control server for the multifunction peripheral 1. The information processing device 3 includes a second communication section 30, the external application section 31, and an external application storage section 32 (see FIG. 1).

The second communication section 30 communicates with the multifunction peripheral 1 via the communication network 50, with the use of the HTTP, which is a communication protocol. The external application storage section 32 stores various kinds of external applications 33 each of which controls the multifunction peripheral 1.

When the external application section 31 receives, from the multifunction peripheral 1, a request for activating one of the external applications 33, the external application section 31 reads out the one of the external applications 33 from the external application storage section 32 and then carries out various kinds of information processing in accordance with the one of the external applications 33.

For example, when the external application section 31 receives, from the multifunction peripheral 1, a request for activating an external application 33, the external application section 31 transmits HTML data, which indicates an operation screen of the external application 33, to the multifunction peripheral 1. Alternatively, for example, when a user command, which has been entered via the operation section 11 of the multifunction peripheral 1, is transmitted from the multifunction peripheral 1 to the information processing device 3, the external application section 31 generates a control command by carrying out an information processing based on the user command and then transmits the generated control command to the multifunction peripheral 1 via the second communication section 30.

<Web Server Section 17>

The following describes details of how the web server section 17 of the multifunction peripheral 1 carries out processes. The web server section 17 includes a storage location detecting section 17a, a judgment section 17b, and a command permitting/prohibiting section 17c (see FIG. 1).

The storage location detecting section 17a is a block which detects, when the web server section 17 receives a control command, a URL (i.e., a storage location) of software which has participated in a transmission of the received control command. Note that, in a pattern where a control command is transmitted from an external application 33 in the information processing device 3 to the web server section 17, the external application 33 is assumed to be software which has participated in the transmission of the control command (hereinafter, this pattern is sometimes referred to as "first pattern"). Alternatively, in a pattern where the web browser section 15 (i) causes the display section 11b to display an operation screen indicated by HTML data supplied from the information processing device 3 and then (ii) transmits, to the web server section 17, a control command generated when an instruction is entered via the operation screen, a cooperated external application 33 of the information processing device 3 and a web browser of the web browser section 15 are assumed to be software which has participated in the transmission of the control command (hereinafter, this pattern is sometimes referred to as "second pattern").

The storage location detecting section 17a detects, by referring to a server variable "REMOTE_ADDR" generated by the web server of the web server section 17, a URL of software which is communicably connected with the web server section 17. Specifically, in the first pattern where a control command is transmitted from an external application 33 in the information processing device 3 to the web server section 17, the storage location detecting section 17a detects a URL of the external application 33 by referring to the server variable "REMOTE_ADDR". Alternatively, in the second pattern where a control command is transmitted from the web browser section 15 to the web server section 17, the storage location detecting section 17a detects a URL of the web browser of the web browser section 15 by referring to the server variable "REMOTE_ADDR".

When the web browser section 15 transmits, to the web server section 17, a control command corresponding to an instruction entered via an operation screen displayed on the display section 11b, the web browser section 15 writes, into an HTTP header "REFERER" of the control command, a URL of an external application 33 from which HTML data of the operation screen has been supplied. With the configuration, the storage location detecting section 17a detects, by referring to the HTTP header "REFERER" of the received control command, the URL of the external application 33 which has supplied the HTML data to the web browser section 15.

In summary, in the first pattern where a control command is transmitted from an external application 33 in the information processing device 3 to the web server section 17 of the multifunction peripheral 1, the storage location detecting section 17a detects a URL of the external application 33 by referring to the server variable "REMOTE_ADDR". On the other hand, in the second pattern where the web browser section 15 (i) causes the display section 11b to display an operation screen indicated by HTML data supplied from the information processing device 3 and then (ii) transmits, to the web server section 17, a control command generated when an instruction is entered via the operation screen, the storage location detecting section 17a detects (a) a URL of the web browser section 15 by referring to the server variable "REMOTE_ADDR" and (b) a URL of a cooperated external application 33 by referring to the HTTP header "REFERER" of the control command. That is, the URL of the external application 33 is detected in the first pattern, and a combination of the URL of the external application 33 and the URL of the web browser of the web browser section 15 is detected in the second pattern.

Note that the information indicated in the server variable "REMOTE_ADDR" is an IP address of a communication destination of the web server section 17. The IP address is information obtained from the communication destination of the web server section 17.

The HTTP header "REFERER" of the control command which is transmitted from the web browser section 15 to the web server section 17 indicates a URL of the external application 33 (which supplies HTML data of the operation screen to the web browser section 15) which is connected with the web browser section 15. The URL is written by the web browser section 15 based on information which has been obtained from the external application 33.

As described above, the storage location detecting section 17a detects, by referring to the server variable "REMOTE_ADDR" or the HTTP header "REFERER", a URL of software from which a control command has been transmitted. In other words, the storage location detecting section 17a detects a URL of command-transmitted software based on information obtained from the command-transmitted software.

The judgment section 17b is a block which judges whether or not a URL(s), indicated as location information of each ID number, is(are) detected by the storage location detecting section 17a. The judgment process is carried out, for the each ID number indicated in the judgment table (see FIG. 2) stored in the storage section 16, by comparing a URL(s), indicated as location information of an item belonging to the each ID number, with a URL(s) detected by the storage location detecting section 17a. The following describes details of the judgment table (control command permission information table) and details of how the judgment section 17b carries out processes.

FIG. 2 illustrates an example of the judgment table. In the judgment table, ID numbers are sequentially indicated, and an item type, an item name, and location information are indicated for each of the ID numbers (see FIG. 2). In the present embodiment, location information is defined by one (1) URL or a set of URLs belonging to one (1) ID number. Specifically, in the judgment table shown in FIG. 2, one (1) URL (http://example.com/app1/) belongs to an ID number 1, and the one (1) URL belonging to the ID number 1 corresponds to one piece of location information. Moreover, two URLs ("http://localhost" and "http://example.com/app2/") belong to an ID number 2, and a combination of the two URLs corresponds to one piece of location information.

In other words, in the judgment table shown in FIG. 2, the ID number 1 is associated with the location information indicative of the one (1) URL (http://example.com/app1/), and the ID number 2 is associated with the location information indicative of the two URLs ("http://localhost" and "http://example.com/app2/").

Note that an ID number (e.g., ID number 2) associated with location information indicative of a combination of a plurality of URLs has a plurality of sub-ID numbers which are associated with the plurality of URLs, respectively.

Moreover, in the judgment table shown in FIG. 2, an item type and an item name represent a comparison target whose URL is to be compared, in a judgment process (described later), with a URL of an item indicated by the item type and the item name. Specifically, a URL of an item belonging to the ID number "1" is compared with a URL written in the server variable "REMOTE_ADDR". Alternatively, a URL of an item belonging to a sub-ID number "1" of the ID number "2" is compared with a URL written in the server variable "REMOTE_ADDR", and a URL of an item belonging to a sub-ID number "2" of the ID number "2" is compared with a URL written in the HTTP header "REFERER".

The location information indicates (i) a URL of software which participates in a transmission of a control command whose execution is permissible or (ii) a combination of URLs of pieces of software which participates in a transmission of a control command whose execution is permissible.

Specifically, in a case where a URL written in the server variable "REMOTE_ADDR" is identical to the URL "http://example.com/app1/" when the web server section 17 receives a control command, the judgment section 17b determines, in the judgment process (described later), to permit execution of the control command (see the location information of the ID number 1 in FIG. 2). Alternatively, in a case where, when the web server section 17 receives a control command, (i) a URL written in the server variable "REMOTE_ADDR" is identical to the URL "http://localhost" and (ii) a URL written in the HTTP header "REFERER" is identical to the URL "http://example.com/app2/", the judgment section 17b determines, in the judgment process (described later), to permit execution of the control command (see the location information of the ID number 2 in FIG. 2).

Note that the URL "http://example.com/app1/" in FIG. 2 is a URL of one of the plurality of external applications 33 stored in the external application storage section 32; the URL "http://localhost" in FIG. 2 is a URL of the web browser of the web browser section 15; and the URL "http://example.com/app2/" in FIG. 2 is a URL of another one of the plurality of external applications 33 stored in the external application storage section 32.

The following describes how the judgment section 17b carries out the judgment process. The judgment section 17b carries out, for each ID number in the judgment table, the judgment process for judging whether or not all URL(s) indicated by location information belonging to the each ID number is(are) detected by the storage location detecting section 17a. Note that the judgment process is carried out in ascending order from the smallest ID number.

Specifically, in a case where the judgment section 17b determines, for a certain ID number, that all URLs indicated by location information belonging to the certain ID number are detected by the storage location detecting section 17a, the judgment section 17b terminates the judgment process at the time and then sends a judged result indicative of "true" to the command permitting/prohibiting section 17c. On the other hand, in a case where the judgment section 17b determines, for another certain ID number, that at least one of URLs all indicated by location information belonging to the another certain ID number is not detected by the storage location detecting section 17a, the judgment section 17b terminates the judgment process carried out on the another certain ID number and then carries out a similar judgment process on a next ID number. In a case where, after carrying out judgment processes on all the ID numbers, the judgment section 17b determines, for each of the ID numbers, that at least one of URLs indicated by location information is not detected by the storage location detecting section 17a, the judgment section 17b sends a judged result indicative of "false" to the command permitting/prohibiting section 17c.

Specifically, in a case where the judgment process is carried out on an ID number (e.g., the ID number 1) associated with location information containing one (1) URL and then the URL is determined to be detected by the storage location detecting section 17a, the judgment process is terminated at the time and a judged result indicative of "true" is sent to the command permitting/prohibiting section 17c. On the other hand, in a case where the judgment process is carried out on an ID number (e.g., the ID number 1) associated with location information containing one (1) URL and then the URL is determined not to be detected by the storage location detecting section 17a, the judgment process carried out on the ID number is terminated, and then the judgment process is carried out on a next ID number.

In a case where the judgment process is carried out on an ID number (e.g., the ID number 2) associated with location information containing a plurality of URLs and then all the plurality of URLs are determined to be detected by the storage location detecting section 17a, the judgment process is terminated at the time and then a judged result indicative of "true" is sent to the command permitting/prohibiting section 17c. On the other hand, in a case where the judgment process is carried out on an ID number (e.g., the ID number 2) associated with location information containing a plurality of URLs and then at least one of the plurality of URLs is determined not to be detected by the storage location detecting section 17a, the judgment process carried out on the ID number is terminated, and then the judgment process is carried out on a next ID number.

With the configuration, in a case where the URL "http://example.com/app1/" is written in the server variable "REMOTE_ADDR" in the first pattern where the web server section 17 receives a control command from the information processing device 3, the storage location detecting section 17a detects the URL "http://example.com/app1/" from the server variable "REMOTE_ADDR", and the judgment section 17b determines, in the judgment process carried out on the ID number 1, that the URL indicated by the location information belonging to the ID number 1 is detected by the storage location detecting section 17a and then transmits a judged result indicative of "true" to the permitting/prohibiting section 17c.

The storage location detecting section 17a and the judgment section 17b carries out processes in a manner described below, in a case where the URL "http://localhost" is written in the server variable "REMOTE_ADDR" and the URL "http://example.com/app2/" is written in the HTTP header "REFERER" in the second pattern where the web browser section 15 causes the display section 11b to display an operation screen indicated by HTML data supplied from the information processing device 3 and then the web server section 17 receives, from the web browser section 15, a control command generated when an instruction is entered via the operation screen. First, the storage location detecting section 17a detects (i) the URL "http://localhost" from the server variable "REMOTE_ADDR" and (ii) the URL "http://example.com/app2/" from the HTTP header "REFERER". Then, the judgment section 17b determines, in the judgment process carried out on the ID number 1, that the URL indicated by the location information belonging to the ID number 1 is not detected by the storage location detecting section 17a, because the storage location detecting section 17a detects the URL "http://localhost" from the server variable "REMOTE_ADDR" instead of the URL "http://example.com/app1/". On the other hand, the judgment section 17b (i) determines, in the judgment process carried out on the ID number 2, that all the URLs contained in the location information belonging to the ID number 2 are detected by the storage location detecting section 17a, because the storage location detecting section 17a detects the URL "http://localhost" from the server variable "REMOTE_ADDR" and the URL "http://example.com/app2/" from the HTTP header "REFERER", and then (ii) transmits a judged result indicative of "true" to the command permitting/prohibiting section 17c.

In a case where a judged result indicative of "true" is transmitted from the judgment section 17b to the command permitting/prohibiting section 17c, the command permitting/prohibiting section 17c determines to permit execution of the control command received by the web server section 17 and then transmits, to the device control section 10, an instruction on executing a process corresponding to the control command. On the other hand, in a case where a judged result indicative of "false" is transmitted from the judgment section 17b to the command permitting/prohibiting section 17c, the command permitting/prohibiting section 17c determines to prohibit execution of the control command received by the web server section 17 and then carries out an error response process (i.e., output of an error notification).

Figure 3:
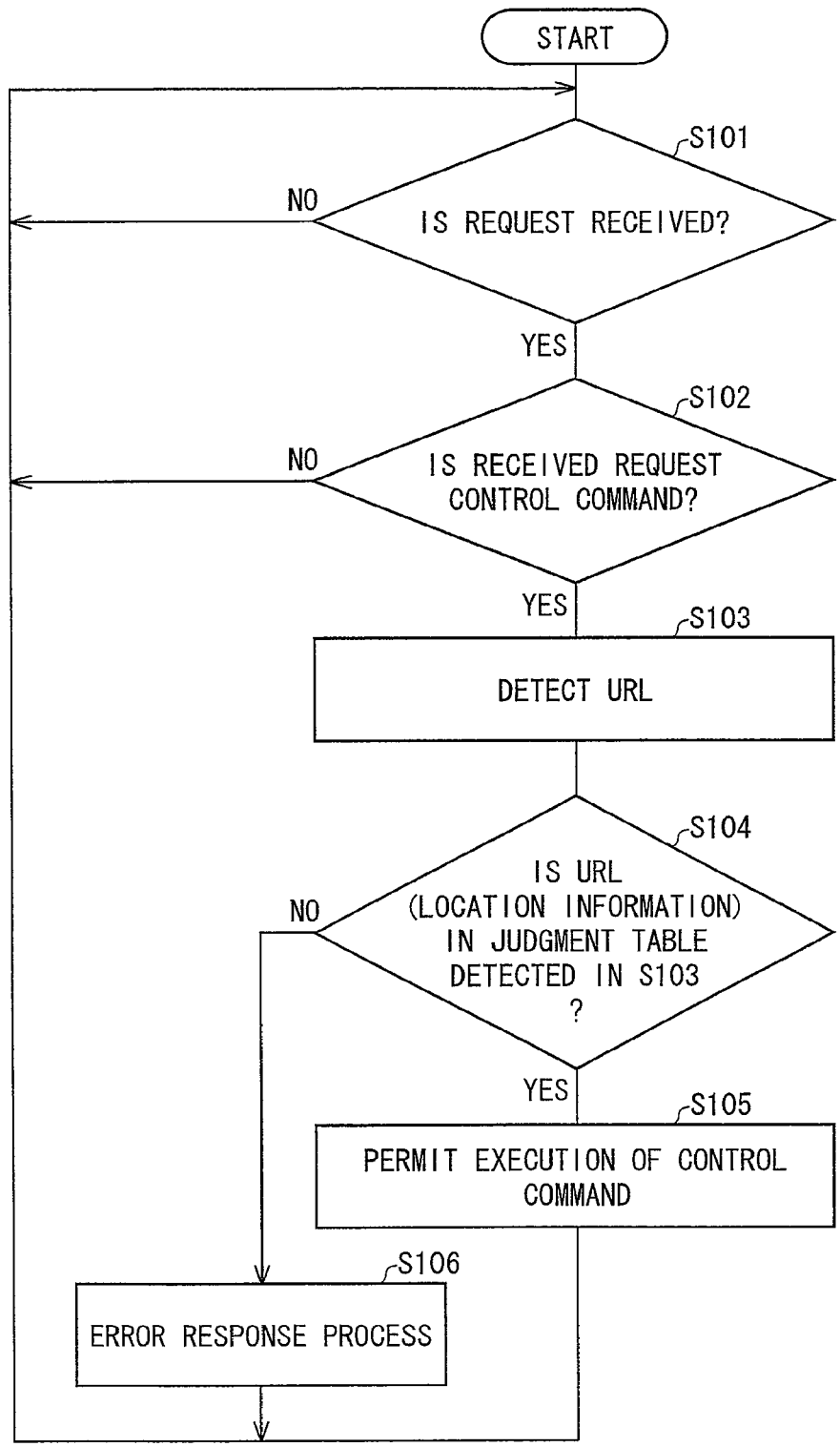
FIG. 3 is a flowchart illustrating processes carried out by a web server section shown in FIG. 1 when the web server section receives a control command.

The following describes a flow of processes which are carried out by the web server section 17 when the web server section 17 receives a control command, with reference to a flowchart shown in FIG. 3. In a step S101, the web server section 17 is waiting for a reception of an HTTP request. When the web server section 17 receives an HTTP request (YES in S101), the web server section 17 judges whether or not the received HTTP request is a control command (S102).

In a case where the web server section 17 determines that the received HTTP request is not a control command (NO in S102), the process returns to the step S101. Whereas, in a case where the web server section 17 determines that the received HTTP request is a control command (YES in S102), the process proceeds to a step S103.

In the step S103, the web server section 17 detects a URL of software (application, web browser) which has participated in the transmission of the received control command. In a step S104, the web server section 17 judges, for each piece of location information in the judgment table stored in the storage section 16, whether or not a URL (or a combination of URLs) indicated by the each piece of location information is detected in the step S103. In a case where the web server section 17 determines that such a URL (or a combination of URLs) is detected in the step S103, the web server section 17 permits execution of the control command (S105). Whereas, in a case where the web server section 17 determines that such a URL is not detected in the step S103, the web server section 17 carries out an error response process (i.e., output of an error notification) (S106). After the step S105 or S106, the process of the web server section 17 returns to the step S101.

As described above, the multifunction peripheral 1 of the present embodiment includes (i) the web server section which receives a control command transmitted by software and (ii) the storage section 16 which stores the judgment table which contains at least one piece of location information indicative of a URL of software which transmits a control command whose execution is permissible. The web server section 17 includes (a) the storage location detecting section 17a which detects a URL of software which has participated in a transmission of a received control command, (b) the judgment section 17b which judges whether or not the URL indicated by the location information is detected by the storage location detecting section 17a, and (c) the command permitting/prohibiting section 17c which (I) prohibits execution of the received control command in a case where the judgment section 17b determines that the URL indicated by the location information is not detected by the storage location detecting section 17a or (II) permits execution of the received control command in a case where the judgment section 17b determines that the URL indicated by the location information is detected by the storage location detecting section 17a.

With the configuration, it is possible to prohibit, without prohibiting execution of a control command transmitted from highly-reliable software, execution of a control command transmitted from hardly-reliable software, provided that location information indicative of a URL of the highly-reliable software is written in the judgment table while location information indicative of a URL of the hardly-reliable software is not written in the judgment table. Moreover, in the configuration of the present embodiment, only execution of a control command is prohibited in a case where the judgment section 17b determines that the URL indicated by the location information contained in the judgment table is not detected by the location detecting section 17a. In other words, it is not prohibited to carry out information communication with software which has participated in the transmission of the control command whose execution is prohibited. The multifunction peripheral 1 of the present embodiment therefore makes it possible to prohibit execution of a control command transmitted by hardly-reliable software but not to prohibit execution of a control command transmitted by highly-reliable software, while communication of information other than the control command is not blocked.

The web server section 17 of the present embodiment receives a control command (hereinafter, referred to as "first control command") which is issued by cooperation of plural pieces of software (e.g., the external application 33 and the web browser). The judgment table stored in the storage section 16 contains pieces of location information at least one of which is first location information indicating URLs of respective pieces of software which participate in a transmission of a first control command whose execution is permissible. When the web server section 17 receives a certain first control command, (a) the storage location detecting section 17a detects storage locations of respective pieces of software which has participated in the transmission of the certain first control command, (b) the judgment section 17b judges, by referring to the judgment table stored in the storage section 16, whether or not all storage locations indicated by the first location information are detected by the storage location detecting section 17a, and (c) the command permitting/prohibiting section 17c (i) prohibits execution of the certain first control command in a case where the judgment section 17b determines that not all the storage locations (URLs) indicated by the first location information are detected by the storage location detecting section 17a or (ii) permits execution of the certain first control command in a case where the judgment section 17b determines that all the storage locations (URLs) indicated by the first location information are detected by the storage location detecting section 17a.

This configuration makes it possible to properly judge whether to execute a control command which has been issued by cooperation of plural pieces of software. It is therefore possible to employ a configuration in which, for example, (i) execution of a first control command, which has been transmitted by cooperation of a web browser of the web browser section 15 and hardly-reliable application software, is prohibited, whereas (ii) execution of another first control command, which has been transmitted by cooperation of the web browser and highly-reliable application software, is permitted.

<Modification Example>

The following describes a modification example of the present invention. In the following modification example, differences from the above embodiment are described, and only a part of the same configuration is described while most of the same configuration is omitted.

In the present modification example, the storage section 16 stores, instead of the judgment table shown in FIG. 2, an application registration table shown in FIG. 4(a) and a judgment table shown in FIG. 4(b).

The application registration table shown in FIG. 4(a) contains (i) a name (application name) of application used in the multifunction peripheral 1, (ii) an application number used to identify the application, and (iii) a URL of the application, where the application name, the application number, and the URL are associated with each other.

The judgment table shown in FIG. 4(b) is basically identical to the judgment table shown in FIG. 2, except that the judgment table shown in FIG. 4(b) indicates, for an item or a sub-item, an application number of an application stored at a URL which is associated with the item or the sub-item. That is, in the judgment table shown in FIG. 4(b), location information containing a URL of an application and an application number of the application are associated with each other.

Moreover, in the present modification example, the web server section 17 includes a number detecting section (not illustrated) which (i) detects, when the web server section 17 receives a control command, a name of an application which is currently being used by the multifunction peripheral 1 and then (ii) detects, based on the detected application name and the application registration table shown in FIG. 4(a), an application number of the application which is currently being used by the multifunction peripheral 1.

Then, the storage location detecting section 17a detects a storage location of software which has participated in the transmission of the control command. This process is carried out in a manner similar to that of the above described embodiment. The judgment section 17b selects, out of ID numbers indicated in the judgment table (see FIG. 4(b)) stored in the storage section 16, only an ID number associated with the application number detected by the number detecting section. Then, the judgment section 17b judges, only for the selected ID number, whether or not all URLs indicated by location information belonging to the selected ID number are detected by the storage location detecting section 17a.

In a case where the judgment section 17b determines, for a certain ID number, that all URLs contained in location information belonging to the certain ID number are detected by the storage location detecting section 17a, the judgment section 17b terminates the judgment process at the time and transmits a judged result indicative of "true" to the command permitting/prohibiting section 17c. This process is carried out in a manner similar to that of the above described embodiment. On the other hand, in a case where the judgment section 17b determines, for another certain ID number, that at least one of URLs all contained in location information belonging to the another certain ID number is not detected by the storage location detecting section 17a, the judgment section 17b terminates the judgment process carried out on the another certain ID number and then carries out a similar judgment process on a next ID number. In a case where, as a result of judgment processes carried out on all the ID numbers, the judgment section 17b determines, for each of the selected ID numbers, that at least one of URLs contained in location information is not detected by the storage location detecting section 17a, the judgment section 17b transmits a judged result indicative of "false" to the command permitting/prohibiting section 17c.

In the present modification example, the storage section 16 stores location information indicative of a URL of an application (i.e., software) and an application number (i.e., software information) indicative of the application, where the location information and the application number are associated with each other. The judgment section 17b carries out the judgment process by referring to, out of pieces of location information stored in the storage section 16, only a piece of location information which is associated with an application number indicating an application which is being used by the multifunction peripheral 1.

With the configuration, a control command transmitted by software, which is not currently being used by the multifunction peripheral 1, is not executed. This makes it possible to reinforce security. The following describes the reason why the security is reinforced by prohibiting execution of the control command transmitted by the software which is not currently being used by the multifunction peripheral 1.

For example, it is assumed that there are applications A and B which employ identical or similar operation screens. The application A is software which transmits scanned image data to an address a. The application B is software which transmits scanned image data to an address b. In a case where the multifunction peripheral 1 receives, from the application B, a control command indicative of an instruction on displaying the operation screen of the application B, while the application A is being used (executed) by the multifunction peripheral 1 (i.e., the operation screen of the application A is being displayed on the multifunction peripheral 1), if execution of the control command would be permitted, (i) the operation screen of the application A being displayed on the multifunction peripheral 1 would be switched to the operation screen of the application B and (ii) the multifunction peripheral 1 would be shifted from the state where the application A is being executed to a state where the application B is being executed. In this case, the operation screen of the application A is identical or similar to that of the application B, and therefore there may be a risk that a user continues operation without noticing that the application being executed has been changed. If the user continues the operation without noticing the change of the application being executed, image data, which should be transmitted to the address a, would be transmitted to the address b. This leads to leakage of information. On the other hand, with the configuration of the present modification example, execution of a control command, which is transmitted from an application which is not being used by the multifunction peripheral 1, is prohibited. This makes it possible to prevent the leakage of information (i.e., the security is reinforced).

<Application Package>

The following describes how to register, on the judgment table shown in FIG. 4(b), location information, an item name, an item type, and an application number which are associated with a certain application (hereinafter, referred to as "application C"), with reference to a flowchart shown in FIG. 6.

First, an application package, which contains location information, a URL, an item type, an item name, an application number, an application name, and identification information which are associated with the application C, is stored in a removable storage medium (e.g., a USB memory device). Note that FIG. 5(a) shows a table indicating the application name and the URL contained in the application package. FIG. 5(b) shows a table indicating the item type, the item name, and the location information contained in the application package.

Then, the removable storage medium (removable medium) storing the application package (package information) is inserted in a slot of the multifunction peripheral 1 so that the application package stored in the removable storage medium is installed in the multifunction peripheral 1.

When the installation is started, the device control section 10 of the multifunction peripheral 1 loads, into a memory (not illustrated) of the multifunction peripheral 1, various kinds of information contained in the application package (S11).

Then, the device control section 10 judges whether or not the identification information loaded in the memory is valid (S12). The following concretely describes this process. The identification information is an identifier (e.g., a vendor key) which indicates authenticity of the application package. In the multifunction peripheral 1, information identical to the identification information is registered in advance. In the step S12, the device control section 10 compares the identification information (hereinafter, referred to as "first identification information") loaded in the memory with identification information (second identification information) which has been registered in advance. In a case where the first information is identical to the second information, the device control section 10 determines that the first identification information is "valid". Whereas, in a case where the first information is different from the second information, the device control section 10 determines that the first identification information is "invalid".

In a case where the device control section 10 determines that the first identification information is invalid (NO in S12), the device control section 10 terminates the process without registering, on the storage section 16, the information in the application package which has been loaded in the memory.

Whereas, in a case where the device control section 10 determines that the first identification information is valid (YES in S12), the device control section 10 registers, on the application registration table of FIG. 4(a), the application name and the URL shown in FIG. 5(a) (S13). At the time, an application number shown in FIG. 4(a) is assigned by the device control section 10.

After the process of the step S13 is finished, the device control section 10 registers, on the judgment table of FIG. 4(b), the item type, the item name, and the location information which are shown in FIG. 5(b) and the application number assigned in the step S13 (S14). At the time, an ID number in the judgment table of FIG. 4(b) is assigned by the device control section 10, and an ID number indicated in the table of FIG. 5(b) is used as a sub-ID number in the judgment table of FIG. 4(b). After the step S14, the device control section 10 finishes the entire processes.

Figure 6:
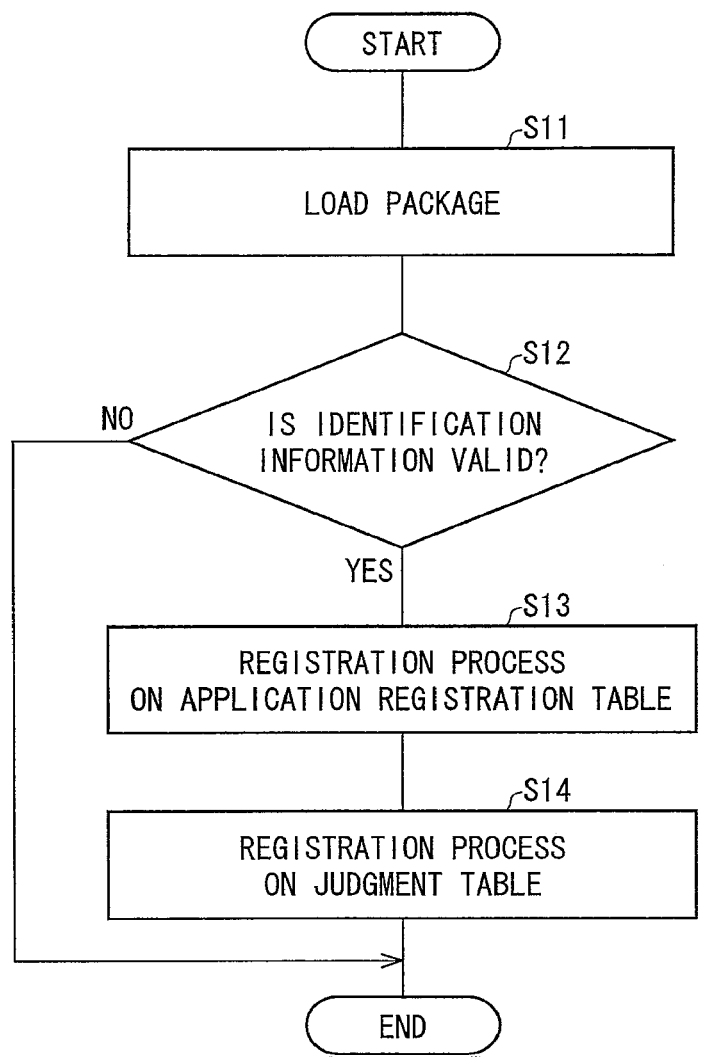
FIG. 6 is a flowchart illustrating processes carried out for registering, on the judgment table in the storage section, location information and the like corresponding to a certain application.

Note that the processes shown in FIG. 6, which are described as above, are processes of registration on the judgment table shown in FIG. 4(b). However, the processes shown in FIG. 6 can be applied to processes of registration on the judgment table shown in FIG. 2. Note however that, in the registration processes on the judgment table shown in FIG. 2, the step S13 is omitted, and the registration of the application number in the step S14 is also omitted. Moreover, in the registration processes on the judgment table shown in FIG. 2, the application package does not need to contain the application name and the URL shown in FIG. 5(a).

In the processes described above, when the application package is installed in the multifunction peripheral 1, the device control section (registration section) 10 collectively registers, on the storage section 16, the various kinds of information such as the location information, the item type, the item name, and the application name contained in the application package. This brings about an advantageous effect of simplification of the registration process.

Moreover, in a case where the application package contains various kinds of information, which are required for operating the application, in addition to the pieces of information shown in FIG. 5(a) and FIG. 5(b), such various kinds of information can also be collectively registered. This makes it possible to further simplify the registration process.

Moreover, in the processes described above, the device control section 10 judges the validity of the identification information in the application package, and the registration processes in the steps S13 and S14 are carried out when the identification information is valid. This makes it possible to register only location information which is associated with a highly reliable application. Moreover, the application package of the present embodiment is supplied from the removable medium to the multifunction peripheral 1. That is, the application package of the present embodiment is not transmitted via the communication network 50. Therefore, the identification information cannot be leaked in the communication network 50.

Note that, in the embodiment described above, the judgment section 17b judges, for each ID number, whether or not all URLs contained in location information belonging to the each ID number are detected by the storage location detecting section 17a. In the judgment process, the judgment section 17b may determine that a first URL in location information is detected by the storage location detecting section 17a, only when the first URL is completely identical to a URL detected by the storage location detecting section 17a. Alternatively, the judgment section 17b may also determine that the first URL is detected by the storage location detecting section 17a, when the first URL is identical to a beginning portion of the URL detected by the storage location detecting section 17a. For example, the URL of the ID number 1 in FIG. 2 may be determined to be detected by the storage location detecting section 17a only when a URL detected by the storage location detecting section 17a is the URL "http://example.com/app1/". Alternatively, for example, the URL of the ID number 1 in FIG. 2 may be determined to be detected by the storage location detecting section 17a, not only in the case where the URL "http://example.com/app1/" is detected by the storage location detecting section 17a, but also in a case where a URL "http://example.com/app1/page1.html" or a URL "http://example.com/app1/somepage.html" is detected by the storage location detecting section 17a.

In the present embodiment, the URLs are used as information for indicating storage locations of pieces of software such as the external application and the web browser. However, IP addresses may be used instead of the URLs.

Moreover, in the present embodiment, the web server section 17 (i) includes the storage location detecting section 17a, the judgment section 17b, and the command permitting/prohibiting section 17c and (ii) serves as the execution permission judging section which judges whether or not to permit execution of a control command received from software. However, the present embodiment is not limited to the configuration. That is, the storage location detecting section 17a, the judgment section 17b, and the command permitting/prohibiting section 17c may be provided in a block other than the web server section 17. In such a case, the block serves as the execution permission judging section. For example, it is possible that the device control section 10 (i) includes the storage location detecting section 17a, the judgment section 17b, and the command permitting/prohibiting section 17c and (ii) serves as the execution permission judging section which judges whether or not to permit execution of a control command received from software.

The present invention is not limited to the embodiments, but can be altered by a skilled person in the art within the scope of the claims. An embodiment derived from a proper combination of technical means disclosed in respective different embodiments is also encompassed in the technical scope of the present invention.

Note that each block of the web server section 17, the web browser section 15, and the device control section 10 can be configured by hardware logic or realized by software with the use of CPU as follows.

That is, each block of the web server section 17, the web browser section 15, and the device control section 10 includes a CPU (central processing unit), a ROM (read only memory), a RAM (random access memory), and a storage device (storage medium) such as a memory. The CPU executes instructions of control programs for realizing the functions. In the ROM, the programs are stored. Into the RAM, the programs are loaded. In the storage device, the programs and various data are stored. The objective of the present invention can also be achieved, by (i) supplying, to the multifunction peripheral 1, a storage medium in which program codes (executable programs, intermediate code programs, source programs) of control programs serving as software for realizing the functions are stored so that a computer can read them and then (ii) causing the computer (or CPU or MPU) to read and execute the program codes stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, the multifunction peripheral 1 can be arranged to be connected to a communication network so that the program codes are delivered over the communication network. The communication network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communication network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network.

The present embodiment is applicable to a multifunction peripheral which carries out a plurality of functions such as a copying function, scanning function, and a facsimile function.

<Recapitulation of Embodiments>

As described above, a multifunction peripheral of the present embodiment includes: a web server section (execution permission judging section) which receives a control command transmitted by software; and a storage section which stores at least one piece of location information each indicative of a storage location of software which transmits a control command whose execution is permissible, the web server section including: a storage location detecting section which detects a storage location of the software which has participated in the transmission of the control command received, a judgment section which judges whether or not the storage location indicated by the location information is detected by the storage location detecting section, and a command permitting/prohibiting section, in a case where the judgment section determines that the storage location indicated by the location information is not detected by the storage location detecting section, the command permitting/prohibiting section prohibiting execution of the control command received, or in a case where the judgment section determines that the storage location indicated by the location information is detected by the storage location detecting section, the command permitting/prohibiting section permitting execution of the control command received.

According to the configuration of the present embodiment, it is possible to prohibit, without prohibiting execution of a control command transmitted from highly-reliable software, execution of a control command transmitted from hardly-reliable software, provided that the storage section stores location information indicative of a storage location of the highly-reliable software but does not store location information indicative of a storage location of the hardly-reliable software. Moreover, in the present invention, only execution of a control command is prohibited in a case where the judgment section determines that the storage location indicated by the location information stored in the storage section is not detected by the storage location detecting section. In other words, it is not prohibited to carry out information communication with software which has participated in the transmission of the control command whose execution is prohibited. The multifunction peripheral of the present invention therefore makes it possible to prohibit execution of a control command transmitted from hardly-reliable software but not to prohibit execution of a control command transmitted from highly-reliable software, while communication of information other than the control command is not blocked.

In the multifunction peripheral of the present embodiment, in addition to the configuration, the control command received by the web server section includes a first control command which is transmitted by cooperation of plural pieces of software; at least one piece of the location information stored in the storage section is first location information indicative of storage locations of respective pieces of software which participate in a transmission of a first control command whose execution is permissible; and in a case where the web server section receives a first control command, (a) the storage location detecting section detects storage locations of the respective pieces of software which have participated in a transmission of the received first control command, (b) the judgment section refers to the storage section so as to judge whether or not all the storage locations indicated by the first location information are detected by the storage location detecting section, and (c) in a case where the judgment section determines that not all the storage locations indicated by the first location information are detected by the storage location detecting section, the command permitting/prohibiting section prohibits execution of the received first control command, or in a case where the judgment section determines that all the storage locations indicated by the first location information are detected by the storage location detecting section, the command permitting/prohibiting section permits execution of the received first control command.

With the configuration, it is possible to accurately determine whether or not to execute a first control command issued by cooperation of plural pieces of software. For example, it is possible to provide a configuration in which execution of a control command, which is transmitted by cooperation of a browser A and hardly-reliable application software B, is prohibited, whereas execution of a control command, which is transmitted by cooperation of the browser A and highly-reliable application software C, is permitted.

In the multifunction peripheral of the present embodiment, in addition to the configuration, the storage section stores (a) the location information and (b) software information regarding the software stored at the storage location indicated by the location information, the location information and the software information being associated with each other; and the judgment section carries out the judgment by referring to, out of the pieces of location information stored in the storage section, only a piece of location information associated with software information regarding software which is being used by the multifunction peripheral.

According to the configuration, execution of a control command issued by software which is not currently being used by the multifunction peripheral is prohibited, even though the software is highly-reliable software. This makes it possible to reinforce security.

In addition to configuration, the multifunction peripheral of the present embodiment further includes a registration section, when package information, which contains the location information, is installed in the multifunction peripheral from a removable medium inserted in the multifunction peripheral, the registration section registering, on the storage section, the location information contained in the package information.

According to the configuration, the location information can be registered in the multifunction peripheral only by installing the package information containing the location information. This brings about an advantageous effect of simplifying the registration of the location information. Moreover, in a case where the package information contains various kinds of information, which are required for operating the software, in addition to the location information, such various kinds of information can also be collectively registered. This makes it possible to further simplify the registration process.

Note that the web server section of the present embodiment can be realized by a computer. In such a case, the present embodiment encompasses (i) a program which causes the computer to serve as the web server section and (ii) a computer-readable storage medium in which the program is stored.

As described above, the multifunction peripheral of the present embodiment makes it possible to prohibit execution of a control command transmitted from hardly-reliable software but not to prohibit execution of a control command transmitted by highly-reliable software, while communication of information other than the control command is not blocked.

REFERENCE SIGNS LIST

1: Multifunction peripheral
3: Information processing device
10: Device control section (registration section)
11: Operation section
11*a*: Input section
11*b*: Display section
15: Web browser section
16: Storage section
17: Web server section (execution permission judging section)
17*a*: Storage location detecting section
17*b*: Judgment section
17*c*: Command permitting/prohibiting section
31: External application section
32: External application storage section
33: External application
40: Communication network
100: Multifunction peripheral control system

The invention claimed is:

1. A multifunction peripheral comprising:
an execution permission judging section which judges whether or not to permit execution of a control command received from software; and
a storage section which stores at least one piece of location information each indicative of a URL of a storage location of software which transmits a control command whose execution is permissible,
the execution permission judging section including:
a storage location detecting section which detects a URL of a storage location of the software which has participated in the transmission of the control command received,
a judgment section which judges whether or not the URL indicated by the location information is detected by the storage location detecting section, and
a command permitting/prohibiting section,
in a case where the judgment section determines that the URL indicated by the location information is not detected by the storage location detecting section, the command permitting/prohibiting section prohibiting execution of the control command received, or
in a case where the judgment section determines that the URL indicated by the location information is detected by the storage location detecting section, the command permitting/prohibiting section permitting execution of the control command received.

2. The multifunction peripheral as set forth in claim 1, wherein:
the control command received by the execution permission judging section includes a first control command which is transmitted by cooperation of plural pieces of software;
at least one piece of the location information stored in the storage section is first location information indicative of URLs of storage locations of respective pieces of software which participate in a transmission of a first control command whose execution is permissible; and in a case where the execution permission judging section receives a first control command,
(a) the storage location detecting section detects URLs of storage locations of the respective pieces of software which have participated in a transmission of the received first control command,
(b) the judgment section refers to the storage section so as to judge whether or not all the URLs indicated by the first location information are detected by the storage location detecting section, and
(c) in a case where the judgment section determines that not all the URLs indicated by the first location information are detected by the storage location detecting section, the command permitting/prohibiting section prohibits execution of the received first control command, or in a case where the judgment section determines that all the URLs indicated by the first location information are detected by the storage location detecting section, the command permitting/prohibiting section permits execution of the received first control command.

3. The multifunction peripheral as set forth in claim 1, wherein:
the storage section stores (a) the location information and (b) software information regarding the software stored at the storage location indicated by the location information, the location information and the software information being associated with each other; and
the judgment section carries out the judgment by referring to, out of the pieces of location information stored in the storage section, only a piece of location information associated with software information regarding software which is being used by said multifunction peripheral.

4. The multifunction peripheral as set forth in claim 1, further comprising a registration section,
when package information, which contains the location information, is installed in said multifunction peripheral from a removable medium inserted in said multifunction peripheral, the registration section registering, on the storage section, the location information contained in the package information.

5. A non-transitory computer-readable storage medium which stores a control program for controlling a multifunction peripheral recited in claim 1, the control program causing a computer to serve as the execution permission judging section.

6. A multifunction peripheral control system comparing:
a multifunction peripheral; and
an information processing device which communicate with the multifunction peripheral via a communication network,
the information processing device including:
a software storage section which stores software for generating a control command for controlling the multifunction peripheral, and
a command generating section for generating the control command with use of the software and transmitting the control command to the multifunction peripheral,
the multifunction peripheral including:
an execution permission judging section which, upon receipt of the control command, judges whether or not to permit execution of the control command, and
a location information storage section which stores at least one piece of location information each indicative of URL of a storage location of software which transmits a control command whose execution is permissible,
the execution permission judging section including:
a storage location detecting section which detects a URL of a storage location of the software which has participated in the transmission of the control command received,
a judgment section which judges whether or not the URL indicated by the location information is detected by the storage location detecting section, and
a command permitting/prohibiting section,
in a case where the judgment section determines that the URL indicated by the location information is not detected by the storage location detecting section, the command permitting/prohibiting section prohibiting execution of the control command received, or
in a case where the judgment section determines that the URL indicated by the location information is detected by the storage location detecting section, the command permitting/prohibiting section permitting execution of the control command received.

7. A multifunction peripheral comprising:
an execution permission judging section which judges whether or not to permit execution of a control command received from software; and
a storage section which stores at least one piece of location information each indicative of an IP address of a storage location of software which transmits a control command whose execution is permissible,
the execution permission judging section including:
a storage location detecting section which detects an IP address of a storage location of the software which has participated in the transmission of the control command received,
a judgment section which judges whether or not the IP address indicated by the location information is detected by the storage location detecting section, and
a command permitting/prohibiting section,
in a case where the judgment section determines that the IP address indicated by the location information is not detected by the storage location detecting section, the command permitting/prohibiting section prohibiting execution of the control command received, or
in a case where the judgment section determines that the IP address indicated by the location information is detected by the storage location detecting section, the command permitting/prohibiting section permitting execution of the control command received.

8. The multifunction peripheral as set forth in claim 7, wherein:
the control command received by the execution permission judging section includes a first control command which is transmitted by cooperation of plural pieces of software;
at least one piece of the location information stored in the storage section is first location information indicative of IP addresses of storage locations of respective pieces of software which participate in a transmission of a first control command whose execution is permissible; and
in a case where the execution permission judging section receives a first control command,
(a) the storage location detecting section detects IP addresses of storage locations of the respective pieces of software which have participated in a transmission of the received first control command, (b) the judgment section refers to the storage section so as to judge whether or not all the IP addresses indicated by the first location information are detected by the storage location detecting section, and (c) in a case where the judgment section determines that not all the IP addresses indicated by the first location information are detected by the storage location detecting section, the command permitting/prohibiting section prohibits execution of the received first control command, or in a case where the judgment section determines that all the IP addresses indicated by the first location information are detected by the storage location detecting section, the command permitting/prohibiting section permits execution of the received first control command.

9. The multifunction peripheral as set forth in claim 7, wherein:

the storage section stores (a) the location information and (b) software information regarding the software stored at the storage location indicated by the location information, the location information and the software information being associated with each other; and the judgment section carries out the judgment by referring to, out of the pieces of location information stored in the storage section, only a piece of location information associated with software information regarding software which is being used by said multifunction peripheral.

10. The multifunction peripheral as set forth in claim 7, further comprising a registration section, when package information, which contains the location information, is installed in said multifunction peripheral from a removable medium inserted in said multifunction peripheral, the registration section registering, on the storage section, the location information contained in the package information.

11. A non-transitory computer-readable storage medium which stores a control program for controlling a multifunction peripheral recited in claim 7, the control program causing a computer to serve as the execution permission judging section.

12. A multifunction peripheral control system comparing:

a multifunction peripheral; and an information processing device which communicate with the multifunction peripheral via a communication network, the information processing device including:

a software storage section which stores software for generating a control command for controlling the multifunction peripheral, and a command generating section for generating the control command with use of the software and transmitting the control command to the multifunction peripheral, the multifunction peripheral including:

an execution permission judging section which, upon receipt of the control command, judges whether or not to permit execution of the control command, and a location information storage section which stores at least one piece of location information each indicative of an IP address of a storage location of software which transmits a control command whose execution is permissible, the execution permission judging section including:

a storage location detecting section which detects an IP address of a storage location of the software which has participated in the transmission of the control command received, a judgment section which judges whether or not the IP address indicated by the location information is detected by the storage location detecting section, and a command permitting/prohibiting section, in a case where the judgment section determines that the IP address indicated by the location information is not detected by the storage location detecting section, the command permitting/prohibiting section prohibiting execution of the control command received, or in a case where the judgment section determines that the IP address indicated by the location information is detected by the storage location detecting section, the command permitting/prohibiting section permitting execution of the control command received.

* * * * *